Jan. 3, 1939.  R. SEIDEL  2,142,976
GEAR
Filed May 1, 1936  2 Sheets-Sheet 1

Inventor.
Richard Seidel

Jan. 3, 1939.  R. SEIDEL  2,142,976
GEAR
Filed May 1, 1936   2 Sheets—Sheet 2

Inventor.

Patented Jan. 3, 1939

2,142,976

UNITED STATES PATENT OFFICE 2,142,976

GEAR

Richard Seidel, Dresden, Germany, assignor to Vasanta Maschinenfabrik A.-G., Dresden, Germany Application May 1, 1936, Serial No. 77,387
In Germany May 3, 1935

4 Claims. (Cl. 74—115)

This invention relates to a transmission gear capable of regulating speed without gradation from zero up to maximum.

The gear according to the invention comprises an eccentrically adjustable member and a plurality of control mechanisms arranged in a circle around the adjustable member and operating on a common shaft, the control mechanisms being provided with rocking levers driven by the eccentric member. Owing to the eccentic adjustment, more or less swinging motion is imparted to the levers and, by means of the control mechanisms, converted into a unilaterally acting rotary motion. To increase the degree of uniformity of the rotary motion transmitted to the driven shaft the control mechanisms employed preferably act in opposite directions so as to utilize both the forward and return motion of the swinging levers controlled by the eccentric members for power transmission.

Figure 1:
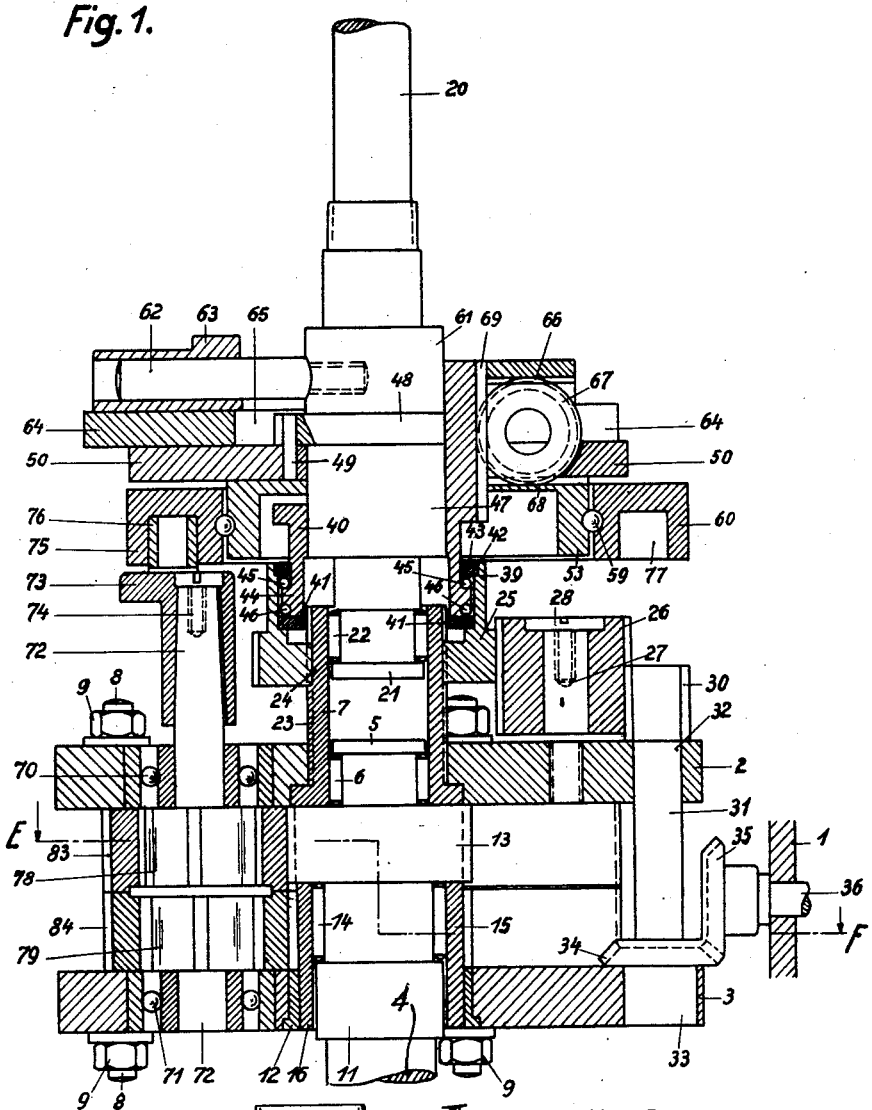
Figure 2:
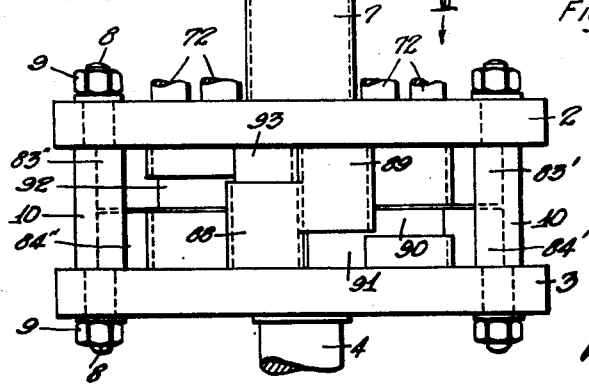
Figure 3:
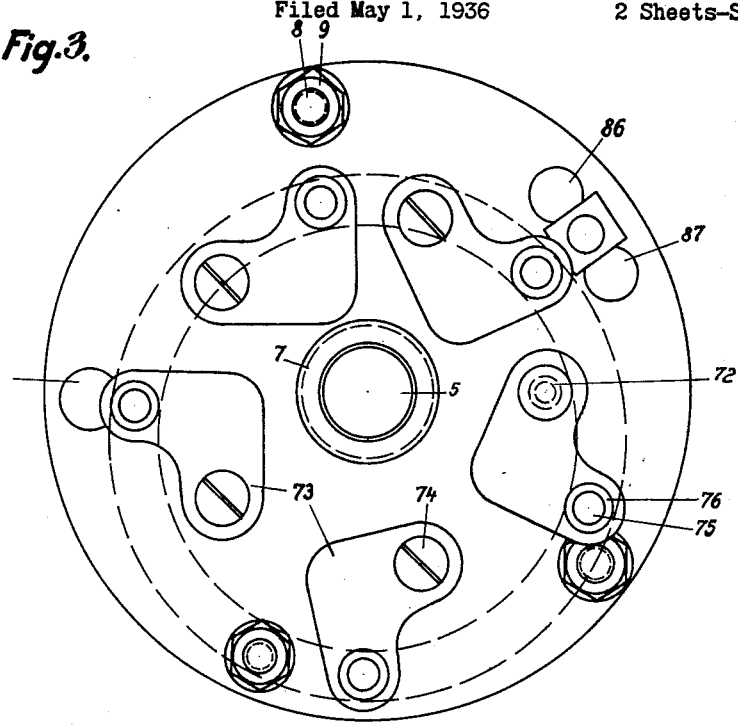
Figure 4:
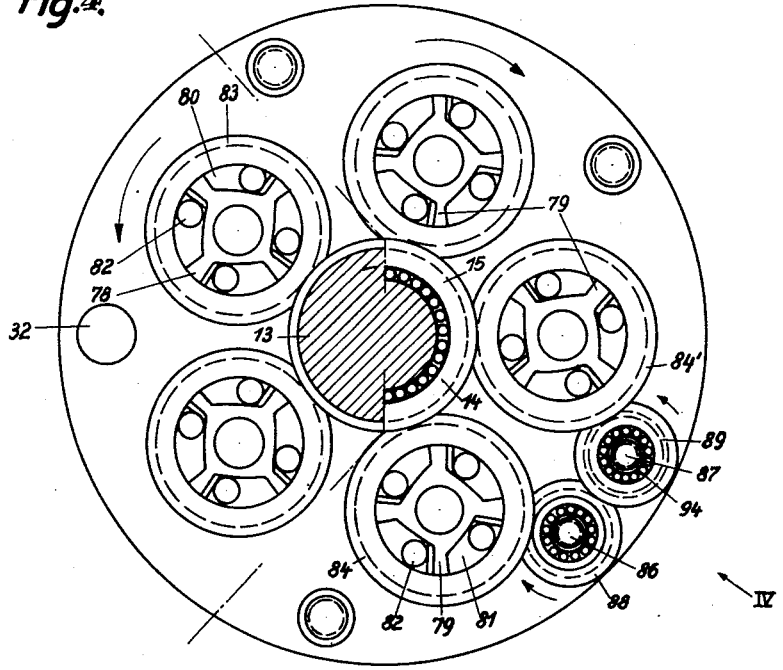

By way of example, the invention is illustrated in the accompanying drawings, in which Figure 1 is a longitudinal section of the gear; Fig. 2, a side view of the driven member in the direction of the arrow IV in Fig. 4; Fig 3, a view of the driven member in the direction of the arrow III in Fig. 2; and Fig. 4, a cross section of the driven member on the line E—F, of Fig. 1.

On the driven side of the machine casing 1 partitions 2, 3 are provided for carrying the driven shaft 4. By means of an interposed pin bearing 6 the front end 5 of the shaft 4 is arranged in a bush 7 the lower end of which is firmly connected with the wall 2. The walls 2 and 3 are connected by means of the screw bolts 8 and the nuts 9 and kept at equal distance from one another by the collar of the bolt 10. The driven shaft 4 has a collar 11 disposed in a bush 12 of the wall 3. Between the two walls 2 and 3 the driven shaft 4 is provided with a driven wheel 13 and a pin bearing 14 on which a central toothed wheel 15 is loosely rotatably disposed. The wheel 15 has a neck 16 guided in the bush 12 and serving as bearing for the collar 11 of the shaft 4.

In the walls 2 and 3 pins 72 are disposed, and the rocking levers 73 are secured to the free ends thereof by means of the screws 74. The angular arms carry the pins 75 whose rolls 76 engage the groove 77 of a rotary member adjustable as to eccentricity. Between the walls 2 and 3 the cages 78 and 79 are firmly keyed to the pin 72 and have the clamp rolls 82 arranged in their recesses 80 and 81. The recesses 80 of the cages 78 taper towards one side and the recesses 81 of the cages 79 towards the other side in such manner that the rolls positioned in the recesses 80 during motion of the cages in one direction drive only the toothed rims 83 loosely rotatably disposed on the cages 78 and during motion of the cages in the other direction, only the toothed rims 84 loosely arranged on the cages 79. All rims 83 of the control mechanisms 78, 80, 82 are in engagement with the toothed rim 13 of the driven shaft 4, whereas the rims 84 are in mesh with the central toothed wheel 15 loosely disposed on the driven shaft.

The toothed rims 84 of the control mechanisms acting in one direction of motion, which are in engagement with the central toothed wheel 15, transmit their rotary motion to the control mechanisms acting in the other direction and provided with the toothed rims 83 by means of the meshing reversing pinions 88, 89 which through interposed pin bearings 94 are loosely rotatable about the journals 86, 87. To arrange the reversing pinions 88, 89 as closely as possible to the adjacent control mechanisms and thus save space the toothed wheels 83'' and 84', which are not in direct engagement with the pinions, as well as the pinions themselves are recessed.

The reversing pinion 89 meshes with the adjacent toothed wheel 83' and possesses at its lower end a recess 91 wherein the toothing of the toothed wheel 84' located below the toothed wheel 83' can freely move. The toothed wheel 84' is provided with a recess 90 wherein the toothing of the reversing pinion 89 can freely move. The reversing pinion 88 in mesh with the adjacent toothed wheel 84'' is also provided with a recess 93 in which the toothing of the toothed wheel 83'' positioned above the toothed wheel 84'' freely moves. The wheel 83'' has a corresponding recess 92 in which the toothing of the reversing pinion 88 can freely move.

The device functions as follows:

To regulate speed the control shaft 36 is turned in one or the other direction, and this rotary motion is transmitted by the bevel gears 34, 35 to the pinion 30 which is in mesh with the spur gear 26. The rotation of the gear 26 is transmitted to the element 25 which with its internal thread 24 engages the external thread of the bush 7 to be screwed up and down in axial direction. The axial motion is transmitted through the thrust bearing taking up axial and radial pressures to the sleeve 40 and to the rack 69 connected therewith, so that the toothed wheel 67 meshing with the rack 69 is turned to the left or right, whereby the ring carrier 53, having the toothing 68 in mesh with the toothed wheel 67, is radially adjusted inwardly or outwardly relative to the shafts 4 and 20. A similar radial motion is carried out by the guide ring 66 loosely disposed on the ring carrier 53, and in the groove 77 of the guide 80 the rolls 76 of the rocking levers 73 are sliding.

When at a corresponding adjustment of the control shaft 36 the guide ring 60 is in central position relative to the driving shaft 20, the rocking levers do not perform any pendulum motion, i. e., the driven shaft 4 stands still. By a corresponding actuation of the control shaft 36 the guide ring 60 is moved farther outwardly in radial direction and owing to its eccentric position brought about thereby imparts to the rocking levers 73 a greater or lesser pendulum motion which has its effect in the form of forward and backward motions on the pin 72 and the members 78, 80, 82, 83 or 78, 81, 82, 84 which transmit their greater or lesser rotary motion to the driven shaft 4.

I claim:—

1. A transmission gear capable of regulating speed without gradation from zero up to maximum, comprising a driving shaft, a driven shaft, an eccentrically adjustable member on said driving shaft, a plurality of control mechanisms arranged in a circle around said eccentric member, rocking levers actuated by said eccentric member, pins about which said rocking levers oscillate, two of said control mechanisms operating in opposite directions being arranged on each pin one behind the other, toothed rims on said control mechanisms, a central toothed wheel loosely rotatably disposed on said driven shaft, the rims of the control mechanisms operating in one direction of stroke being in mesh with said central toothed wheel, a toothing on the driven shaft, the rims of the control mechanisms operating in the other direction of stroke being in engagement with the toothed rim of the driven shaft, and reversing gears each in mesh with a rim of two control mechanisms operating in one and the other direction of stroke.

2. A gear according to claim 1, wherein the control mechanisms comprise recessed cages arranged on the pins, clamp rolls disposed in the recesses of the cages, the recesses in the cages operating in one or the other direction of stroke being opposite, and wherein the toothed rims are loosely rotatably arranged on the cages and the clamp rolls in the cages drive the rims in one direction at a time.

3. A gear according to claim 1, wherein the reversing gears in mesh with one another are recessed at opposite ends, the toothings of two adjacent control mechanisms acting in opposite direction being loosely movable in said recesses, said control mechanisms being recessed also, the toothings of the reversing gears being loosely movable in said recesses.

4. A transmission gear capable of regulating speed without gradation from zero up to maximum, comprising a driving shaft, a driven shaft, an eccentrically adjustable member on said driving shaft, a plurality of control mechanisms arranged in a circle around said eccentric member, rocking levers actuated by said eccentric member, a pin about which said rocking levers oscillate, two of said control mechanisms operating in opposite directions being arranged on said pin one behind the other, toothed rims on said control mechanisms, a central toothed wheel loosely rotatably disposed on said driven shaft, the rims of the control mechanisms operating in one direction being in mesh with said central toothed wheel, a toothed rim for the driven shaft, the rims of the control mechanisms operating in the other direction being in engagement with the toothed rim of the driven shaft, reversing gears each in mesh with a rim of two control mechanisms operating in one and the other direction of stroke, said control mechanisms comprising recessed cages arranged on pins, clamp rolls disposed in the recesses of the cages, the recesses in cages operating in one or the other direction being opposite, toothed rims loosely rotatably arranged on the cages, said clamp rolls in the cages driving the rims in one direction at a time, said reversing gears in mesh with one another being recessed at opposite ends and the toothings of two adjacent control mechanisms acting in opposite directions freely move in said recesses, said control mechanisms being recessed also to permit free motion of the toothings of the reversing gears in said recesses, the second control mechanisms operating in opposite direction and positioned above or below the two adjacent control mechanisms being in engagement with the reversing gears.

RICHARD SEIDEL.